(12) United States Patent
Mason et al.

(10) Patent No.: US 7,521,146 B2
(45) Date of Patent: Apr. 21, 2009

(54) SWITCHING MODES OF OPERATION OF A FUEL CELL

(75) Inventors: Richard W. Mason, Rexford, NY (US); Michael Pomykai, Scotia, NY (US); Timothy Lang, Starkville, MS (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 11/319,044

(22) Filed: Dec. 27, 2005

(65) Prior Publication Data

US 2007/0148507 A1   Jun. 28, 2007

(51) Int. Cl.
H01M 2/14 (2006.01)
H01M 2/00 (2006.01)
H01M 2/02 (2006.01)
C25B 1/02 (2006.01)

(52) U.S. Cl. .................. 429/39; 429/34; 205/637
(58) Field of Classification Search ............ 429/34, 429/39; 205/637
See application file for complete search history.

(56) References Cited

U.S. PATENT DOCUMENTS

| | | |
|---|---|---|
| 4,769,297 A | 9/1988 | Reiser et al. |
| 4,963,443 A | 10/1990 | Kamoshita |
| 5,316,643 A | 5/1994 | Ahn et al. |
| 5,366,818 A | 11/1994 | Wilkinson et al. |
| 5,543,238 A | 8/1996 | Strasser |
| 5,763,113 A * | 6/1998 | Meltser et al. ............. 429/13 |
| 5,935,726 A | 8/1999 | Chow et al. |
| 6,096,449 A | 8/2000 | Fuglevand et al. |
| 6,299,996 B1 | 10/2001 | White et al. |
| 6,322,914 B1 | 11/2001 | Chow et al. |
| 6,541,141 B1 | 4/2003 | Frank et al. |
| 6,569,549 B1 | 5/2003 | Sawyer |
| 6,589,678 B1 | 7/2003 | McElroy |
| 6,660,416 B2 | 12/2003 | Sederquist |
| 6,787,257 B2 | 9/2004 | James et al. |
| 6,893,755 B2 | 5/2005 | Leboe |
| 6,960,401 B2 | 11/2005 | Barton et al. |
| 6,979,506 B2 | 12/2005 | Ballantine et al. |
| 7,326,481 B2 | 2/2008 | Ballantine et al. |
| 2002/0094469 A1 | 7/2002 | Yoshizumi et al. |
| 2004/0013919 A1 * | 1/2004 | Ueda et al. ................ 429/22 |
| 2005/0031917 A1 * | 2/2005 | Margiott et al. ........... 429/17 |
| 2005/0118470 A1 * | 6/2005 | Harada et al. ............. 429/22 |
| 2006/0040158 A1 * | 2/2006 | Numata et al. ............ 429/34 |
| 2006/0078771 A1 | 4/2006 | Ballantine et al. |

* cited by examiner

*Primary Examiner*—Patrick Ryan
*Assistant Examiner*—Eugenia Wang
(74) *Attorney, Agent, or Firm*—Trop, Pruner & Hu, P.C.

(57) ABSTRACT

A technique that is usable with a fuel cell stack includes routing an anode exhaust of the fuel cell stack to an anode exhaust line. Based on a mode operation of the fuel cell stack, communication is selectively established between a cathode chamber of the fuel cell stack and the anode exhaust line.

12 Claims, 6 Drawing Sheets

SWITCHING MODES OF OPERATION OF A FUEL CELL

BACKGROUND

The invention generally relates to switching operation of a fuel cell and more particularly, the invention generally relates to automatically switching between a mode in which the fuel cell provides power and a mode in which the fuel cell functions as an electrochemical pump.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 60° Celsius (C.) to 70° temperature range. Another type employs a phosphoric-acid-based polybenziamidazole, PBI, membrane that operates in the 150° to 200° temperature range. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

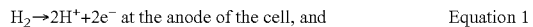

$H_2 \rightarrow 2H^+ + 2e^-$ at the anode of the cell, and   Equation 1

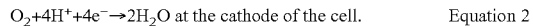

$O_2 + 4H^+ + 4e^- \rightarrow 2H_2O$ at the cathode of the cell.   Equation 2

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack is one out of many components of a typical fuel cell system, such as a cooling subsystem, a cell voltage monitoring subsystem, a control subsystem, a power conditioning subsystem, etc. The particular design of each of these subsystems is a function of the application that the fuel cell system serves.

The membranes of a newly assembled fuel cell stack typically are conditioned by cycling the membranes through an incubation period, a period of stack operation to "break-in" the membranes. Until the membranes are broken in, the terminal voltage of the stack gradually rises over time before the terminal voltage stabilizes near a generally constant voltage level to mark the end of the incubation period. Among the possible theories to explain why the incubation period is needed, the membranes may include catalyst residue that, until removed during the incubation period, hinders the performance of the membranes. Another theory is that the membranes are initially dry, a condition that hinders the performance of the stack until the membranes hydrate during the incubation period.

The conditioning of the fuel cell stack is a lengthy process that may involve a considerable amount of time changing electrical and plumbing connections. Thus, there exists a continuing need for better ways to condition a fuel cell stack.

SUMMARY

In an embodiment of the invention, a technique that is usable with a fuel cell stack includes routing an anode exhaust of the fuel cell stack to an anode exhaust line. Based on a mode operation of the fuel cell stack, communication is selectively established between a cathode chamber of the fuel cell stack and the anode exhaust line.

In another embodiment of the invention, a technique that is usable with a fuel cell includes incubating a membrane of the fuel cell. The incubation includes alternating a state of operation for the fuel cell between a first state in which the fuel cell produces power and a second state in which the fuel cell functions as an electrochemical pump.

Advantages and other features of the invention will become apparent from the following drawing, description and claims.

DETAILED DESCRIPTION

Figure 1:
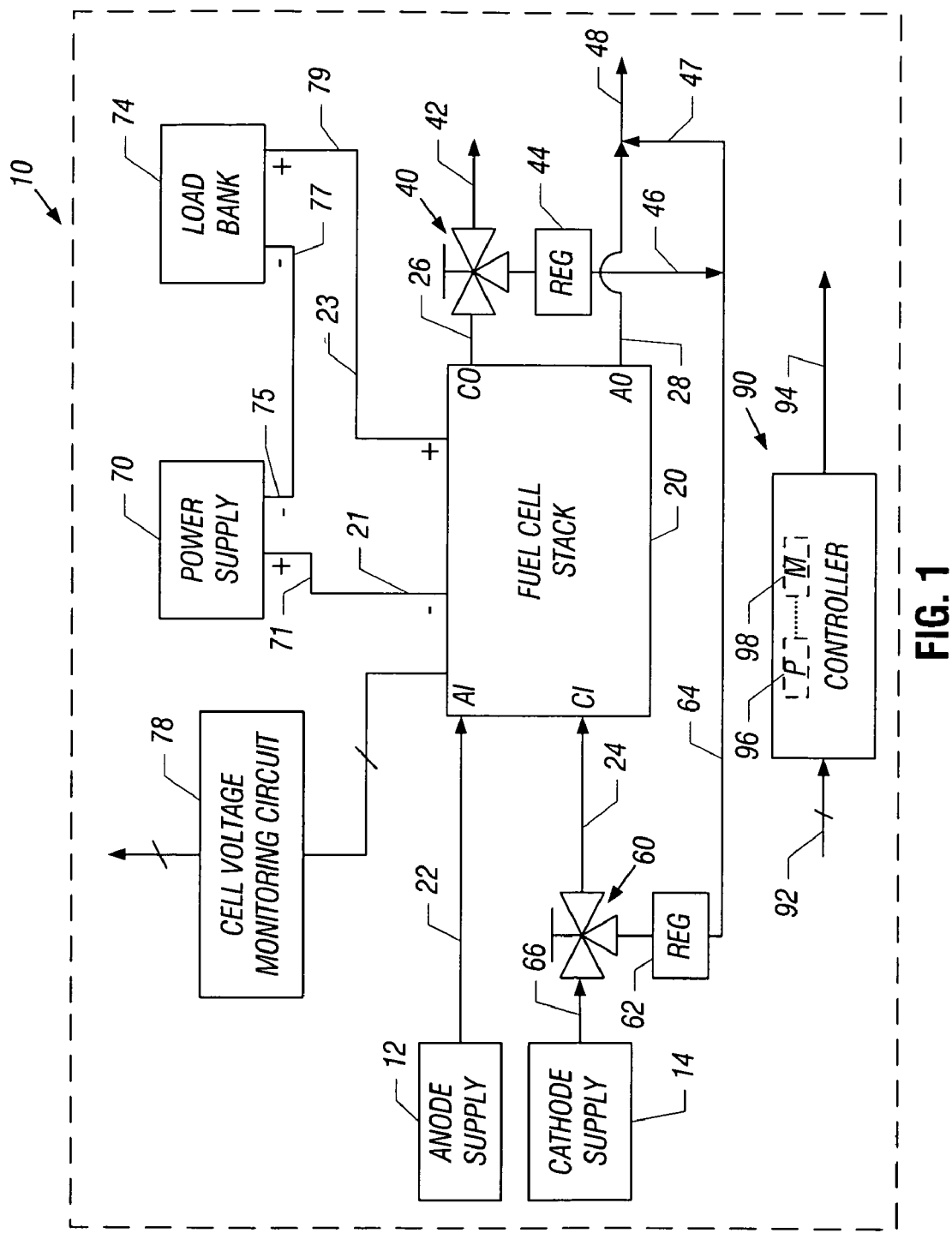
FIG. 1 is a schematic diagram of a system to condition a fuel cell stack according to an embodiment of the invention.

Referring to FIG. 1, a fuel cell system 10 may be used for purposes of conditioning a fuel cell stack 20 to incubate the membranes of the fuel cell stack 20. As further described below, in this incubation, the system 10 causes the fuel cell stack 20 to operate both in a mode of operation in which the fuel cell stack 20 produces electrical power as well as in a mode operation in which the fuel cell stack 20 functions as an electrochemical pump (a hydrogen pump, for example). Thus, the fuel cell system 10 may be viewed as containing the fuel cell stack 20; and the remaining part of the fuel cell system 10 forms a control subsystem for purposes of regulating the mode of operation of the fuel cell stack 20.

When the fuel cell stack 20 is in a mode of operation in which the stack 20 provides power, the fuel cell stack 20 receives an incoming fuel flow (at its anode inlet 22) into its anode chamber. In the context of this application, the "anode chamber" of the fuel cell stack 20 means the anode input plenum, the anode flow chambers and possibly the anode exhaust outlet of the fuel cell stack 20. The fuel cell stack 20, during its power producing mode of operation, also receives an incoming oxidant flow at its cathode inlet 24. The incoming oxidant flow flows into the cathode chamber of the fuel cell stack 20, which, in the following description, means the cathode input plenum, the cathode flow channels and possibly the cathode outlet of the fuel cell stack 20. As depicted in FIG. 1, the incoming fuel and oxidant flows are provided by an anode supply 12 (a reformer or hydrogen tank, as examples) and a cathode supply 14 (an air blower, for example), respectively.

In the power producing mode of the fuel cell stack 20, the fuel cell stack 20 provides a cathode exhaust (at its cathode outlet 26) that is routed to a cathode exhaust line 42. By its very nature, the cathode exhaust during the power producing mode of the fuel cell stack 20 is non-combustible. Also, during the power producing mode of operation of the fuel cell stack 20, an anode outlet 28 of the fuel cell stack 20 provides an anode exhaust flow that is routed to an anode exhaust line 48. Unlike the cathode exhaust, the anode exhaust is combustible and may be communicated to a flare or oxidizer or routed back to the anode inlet 22, depending on the particular embodiment of the invention.

The fuel cell stack 20 produces electrical power in its power producing mode of operation; and stack terminals 21 and 23 of the fuel cell stack 20 provide a DC stack voltage that is received by a load bank 74.

In its electrochemical pump mode of operation, the fuel cell stack 20 receives the incoming fuel flow at its anode inlet 22. However, instead of producing electrical power, the fuel cell stack 20 receives power at its stack terminals 21 and 23 from a power supply 70 that has supply terminals 71 and 73, which are coupled to the stack terminals 21 and 23. In response to the current, hydrogen ions migrate across the fuel cell membranes into the cathode chamber of the fuel cell stack 20. Thus, unlike the power producing mode of operation, in the electrochemical mode of operation, a combustible exhaust appears at the cathode outlet 26. Furthermore, the cathode supply 14 is isolated from the cathode chamber of the fuel cell stack 20 during the electrochemical mode of operation. Thus, a combustible gas also appears at the cathode inlet 24. Therefore, during the electrochemical pump mode of operation, the cathode chamber of the fuel cell stack 20 is connected to the anode exhaust line 48.

For purposes of automatically and selectively connecting the cathode chamber of the fuel cell stack 20 to the anode exhaust line 48, the system 10 includes pneumatic operated three-way valves 60 and 40, in accordance with some embodiments of the invention.

As depicted in FIG. 1, the valve 40 has an inlet that is connected to the cathode outlet 26, and an outlet of the valve 40 is connected to the anode exhaust line 42. A second output of the valve 40 is coupled to the anode exhaust line 48. More specifically, in accordance with some embodiments of the invention, this other outlet of the valve 40 may be coupled through a back pressure regulator 44 to a conduit 46, which is in communication with the anode exhaust line 48. Therefore, to configure the fuel cell stack 20 for the electrochemical pump mode of operation, the valve 40 is controlled to connect the cathode outlet 26 to the anode exhaust line 48 and isolate the cathode outlet 26 from the cathode exhaust line 42. Conversely, during the power producing mode of operation of the fuel cell stack 20, the valve 40 is operated to connect the cathode outlet 26 to the cathode exhaust 42 and isolate the cathode outlet 26 from the anode exhaust line 48.

The valve 60 has an inlet that is connected to the outlet 66 of the cathode supply 14. One outlet of the valve 40 is connected to the cathode inlet 24, and another outlet of the valve 60 is connected through a backpressure regulator 62 to a communication line 64. The communication line 64 is connected together with the communication 46 to form a communication line 47 that is connected to the anode exhaust line 48. Thus, due to the above-described connections, during the electrochemical pump mode of operation of the fuel cell stack 20, the valve 60 is operated to isolate the cathode supply 14 from the cathode inlet 24 and connect to the cathode inlet 24 to the anode exhaust line 48. Conversely, during the power producing mode of operation of the fuel cell stack 20, the valve 60 is operated to isolate the cathode inlet 24 from the anode exhaust line 48 and connect the cathode supply 14 to the cathode inlet 24.

In accordance with some embodiments of the invention, the valves 40 and 60 are operated automatically by a controller 90 of the system 10. In this regard, the controller 90 may include a processor 96 which represents one or more microcontrollers or microprocessors, depending on the particular embodiment of the invention. The processor 96 executes instructions that are stored in a memory 98 for purposes of controlling the valves 40 and 60 and performing one or more of the techniques that are described herein. As depicted in FIG. 1, the controller 90 may include, for example, input terminals 92 for purposes of receiving status signals, sensor signals, commands, etc. In response to the incoming input to the controller 90, the controller 90 may form one or more signals on output terminals 94 for purposes of controlling valves (such as the valves 40 and 60), motors, relays, communicating commands, etc., depending on the particular embodiment of the invention.

In addition to controlling the connections to the anode exhaust line 48 based on the particular mode of operation of the fuel cell stack 20, the electrical connections to the fuel cell stack 20 are also regulated based on the stack's mode of operation. In this regard, during the electrochemical pump mode of operation, the power supply 70 provides electrical power to the fuel cell stack 20 in order to promote the electrochemical pumping by the stack 20. In this mode of operation, the power that is demonstrated by the load bank 74 is also regulated. For example, in accordance with some embodiments of the invention, the load bank 74 may be disconnected or shorted for to the electrochemical pump mode of operation. In other embodiments of the invention, the power that is demanded by the load bank 74 may be reduced to be a relatively small load (as compared to the normal mode of operation). Conversely, during the normal power producing mode of the fuel cell stack 20, the power supply 70 may be turned off, in which case the terminals of the power supply 70 may be shorted. Additionally, in the power producing mode, the power that is demanded by the load bank 74 may be significantly increased.

Among the other features of the fuel cell system 10, in accordance with some embodiments of the invention, the fuel cell system 10 includes a cell voltage monitoring circuit 78. The cell voltage monitoring circuit 78, may, for example, continually scan the cell voltages of the fuel cell stack 20 for purposes of communicating the cell voltages to the controller 90. Thus, the controller 90 may, based on the cell voltages, determine whether the fuel cell stack 20 is operating properly and control components of the fuel cell system 10 in response thereto.

The fuel cell system may also include various other components and subsystems, such as, for example, temperature regulation subsystem that may circulate (for example) a coolant through the coolant flow channels of the fuel cell stack 20 for purposes of regulating the temperature of the stack 20.

Figure 2:
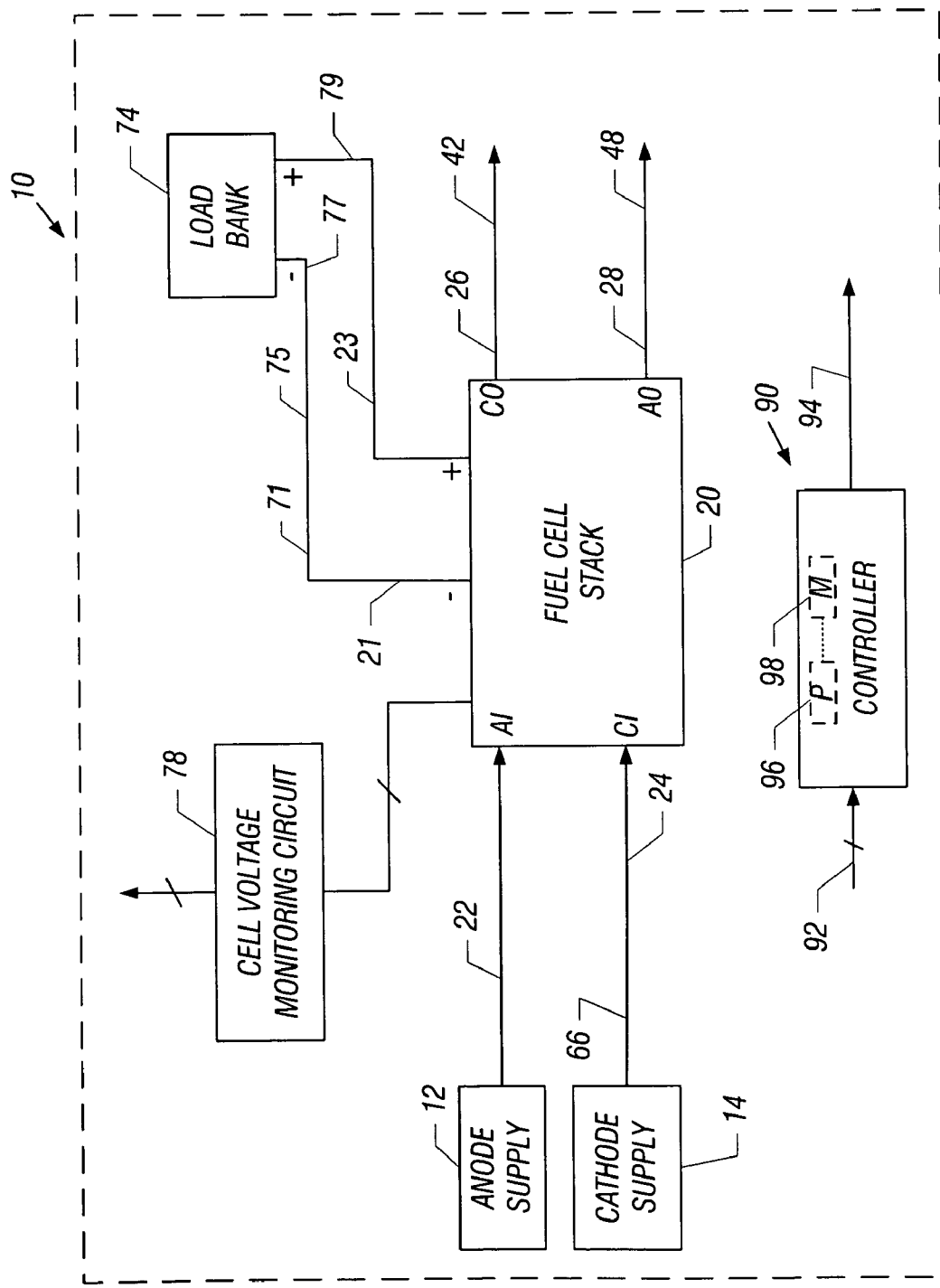
FIG. 2 depicts the system of FIG. 1 for a mode of operation of the fuel cell stack in which the fuel cell stack produces power.

FIG. 2 depicts the fuel cell system 10 for the mode of operation in which the fuel cell stack 20 is producing electrical power. In this mode of operation, the cathode outlet 26 is connected to the cathode exhaust line 42, and the cathode inlet 24 is connected to receive oxidant from the cathode supply 14. Additionally, in this mode of operation, the output terminals of the power supply 70 are shorted so that only the load 74 is coupled across the DC stack terminals 21 and 23 of the fuel cell stack 20.

Figure 3:
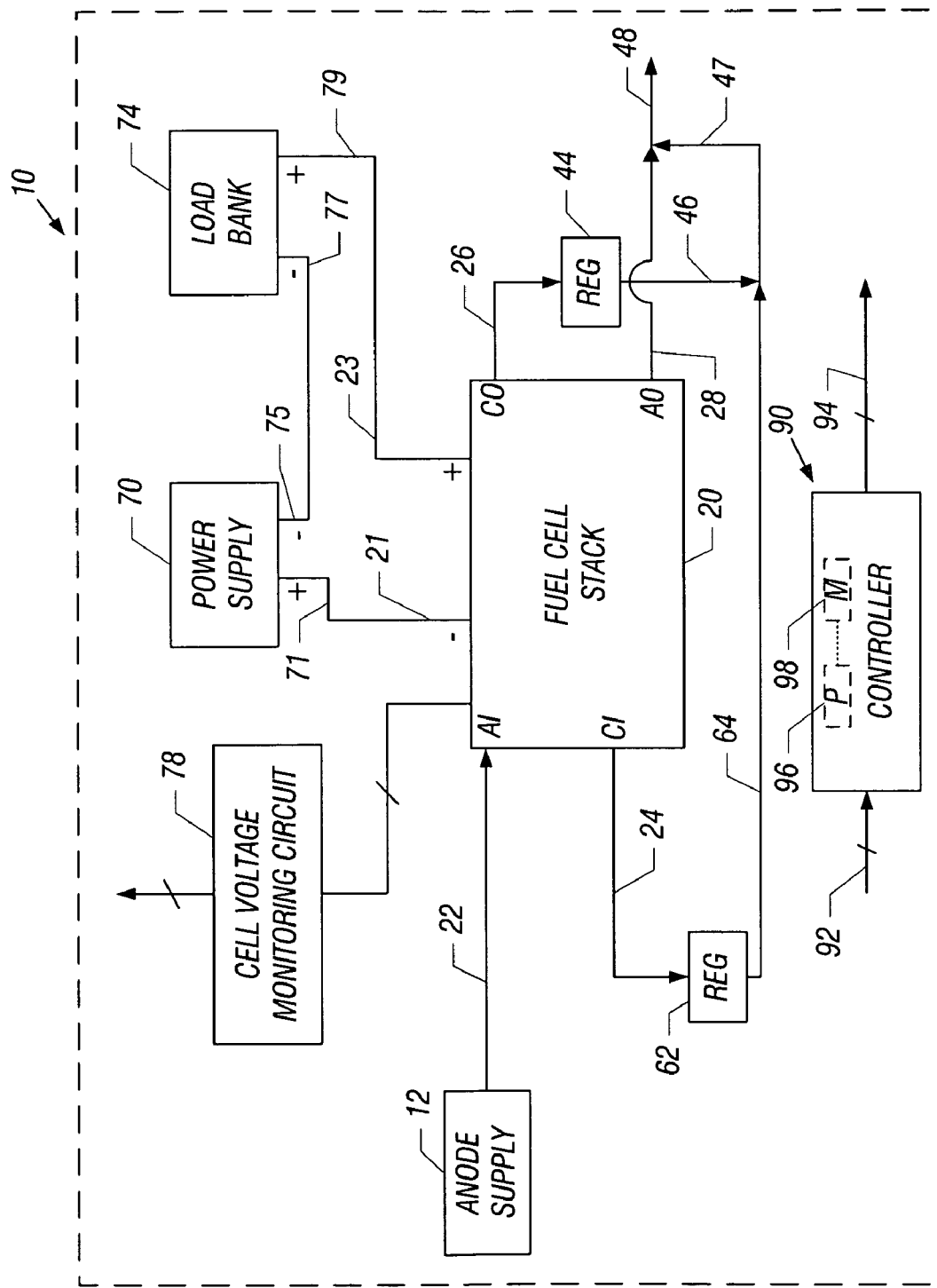
FIG. 3 depicts the system of FIG. 1 for a mode of operation in which the fuel cell stack functions as an electrochemical pump.

FIG. 3 depicts the fuel cell system 10 for the mode of operation in which the fuel cell stack 20 functions as an electrochemical pump. In this mode of operation, the cathode outlet 26 is coupled through the backpressure regulator 44 to the anode exhaust line 48, and the cathode inlet 24 is coupled through the backpressure regulator 62 to the anode exhaust line 48. Furthermore, the power supply 70 and the load bank 74 may be coupled together in series between the DC stack output terminals of the fuel cell stack 20. For this mode of operation, the load bank 74 may present only a slight DC load; and the power supply 70 provides an electrical current to the fuel cell stack 20.

Figure 4:
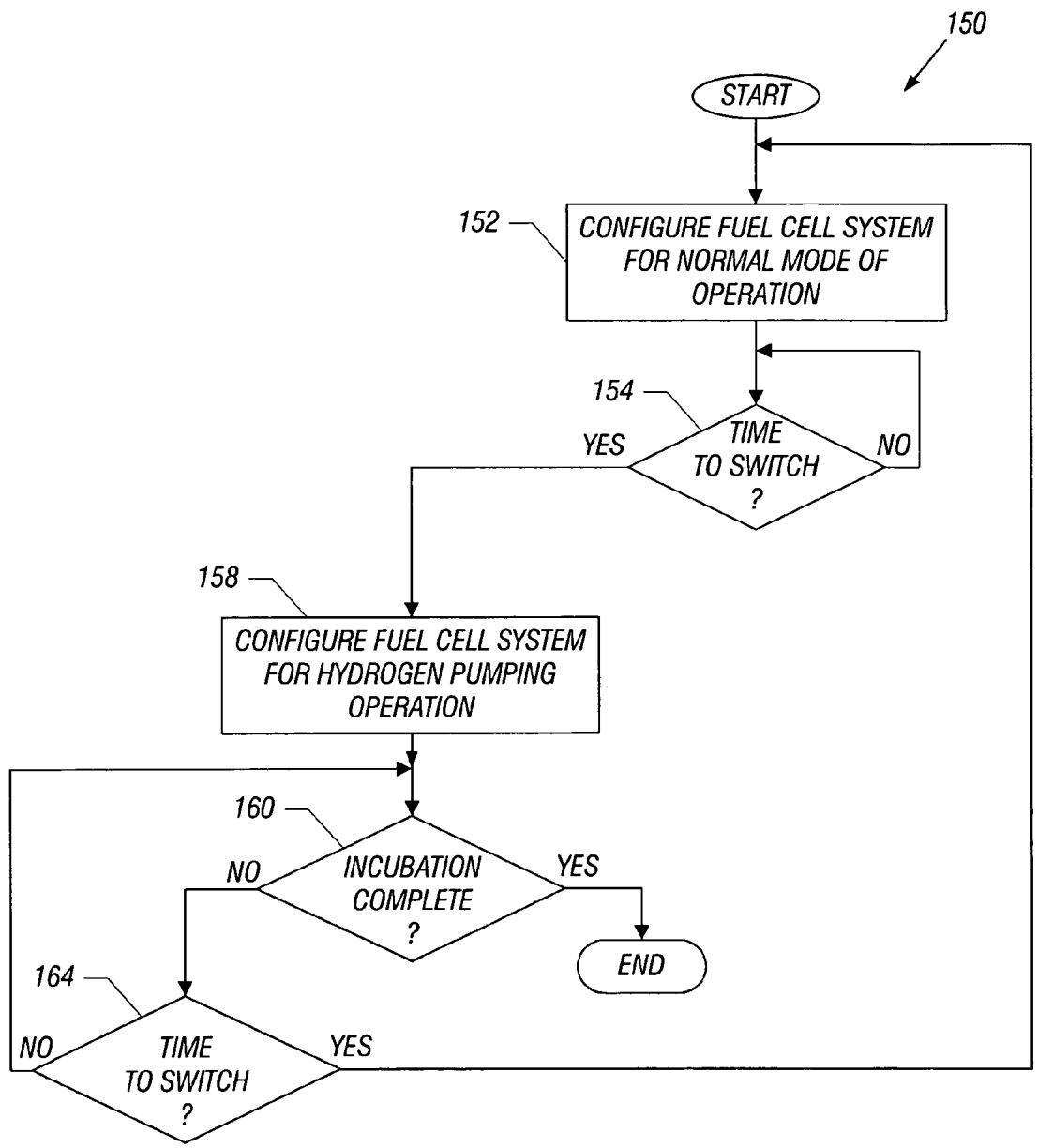
FIG. 4 is a flow diagram depicting a technique to condition the fuel cell stack according to an embodiment of the invention.

Referring to FIG. 4 in conjunction with FIG. 1, in accordance with an embodiment of the invention, the controller 90 may perform a technique 150 for purposes of conditioning the fuel cell stack 20 to incubate the membranes of the stack 20. Pursuant to the technique 150, the controller 90 initially configures (block 152) the fuel cell system 10 for a normal mode of operation in which the fuel cell stack 20 produces electrical power. The operation of the fuel cell stack 20 then continues for a particular duration of time. As an example, the controller 90 may measure a fixed duration of time and switch the mode of operation of the fuel cell stack 20 in response to the expiration of the time period. In other embodiments of the invention, the controller 90 may monitor a particular parameter of the fuel cell stack 20 or fuel cell system 10 for purposes of determining when to switch the mode of operation.

In response to determining (diamond 154) that it is time to switch the mode of operation of the fuel cell stack 20, the controller 90 then configures (block 158) the fuel cell system 10 for a hydrogen pumping operation in which the fuel cell stack 20 serves as an electrochemical pump. Thus, pursuant to block 150, the controller 90 operates the valves 40 and 60 to connect a cathode chamber of the fuel cell stack 20 to the anode exhaust line 48, and the controller 90 isolates the cathode inlet 24 from the cathode supply 14.

The controller 90 determines (diamond 160) whether incubation is complete and if not, determines (diamond 164) whether it is time to switch the mode of operation of the fuel cell stack 20. Once this occurs, control then transitions to block 152 in which the controller 90 configures the fuel cell system for the normal mode of operation in which the fuel cell stack produces electrical power.

Thus, to summarize, initially in the incubation of the fuel cell stack 20, the controller 90 configures the fuel cell stack 20 to produce electrical power. The controller subsequently alternates the modes of operation of the fuel cell stack 20 between the electrochemical and power producing modes of operation. As a more specific example, in accordance with some embodiments of the invention, the modes of operation of the fuel cell stack 20 are switched between the electrochemical pump and power producing modes approximately five times. By automatically configuring the stack 20, time consumed by manually reconnected the plumbing and reconfiguring the electrical system for the system 10 is saved, thereby conserving cost and reducing incubation time. For example, if about thirty minutes of station modifications are required each time that the fuel cell system 10 is switched between fuel cell operation and hydrogen pumping mode, then about 2.5 hours is saved in the incubation of the fuel cell stack 20. Other and different advantages may be possible in other embodiments of the invention.

Figure 5:
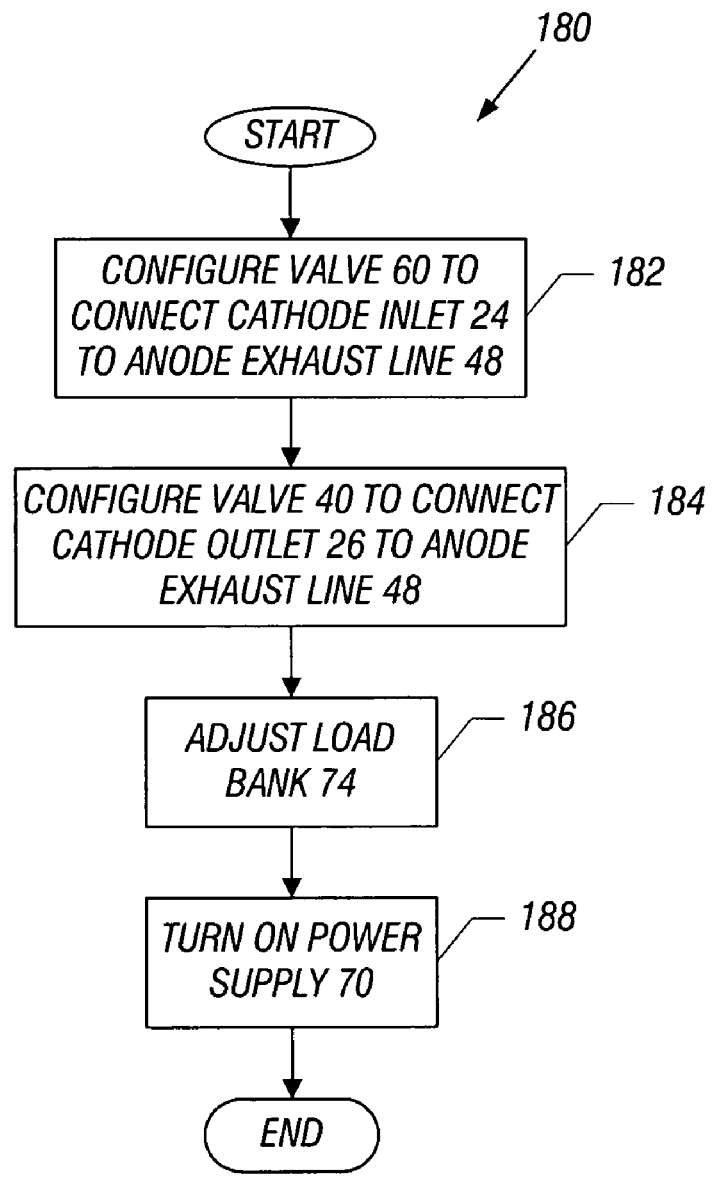
FIG. 5 is a flow diagram depicting a technique to automatically configure the fuel cell stack to function as an electrochemical pump according to an embodiment of the invention.

Referring to FIG. 5, in accordance with some embodiments of the invention, the controller 90 performs a technique 180 for purposes of configuring the fuel cell stack 20 to operate in the electrochemical pump mode of operation. Pursuant to the technique 180, the controller 90 configures (block 182) the valve 60 to connect the cathode inlet 24 to the anode exhaust line 48. The controller 90 also configures (block 184) the valve 40 to connect the cathode outlet 26 to the anode exhaust line 48. Also pursuant to the technique 180, the controller 90 adjusts (block 186) the load bank 74 to demand a relatively low level of power and turns on (block 188) the power supply 70.

Figure 6:
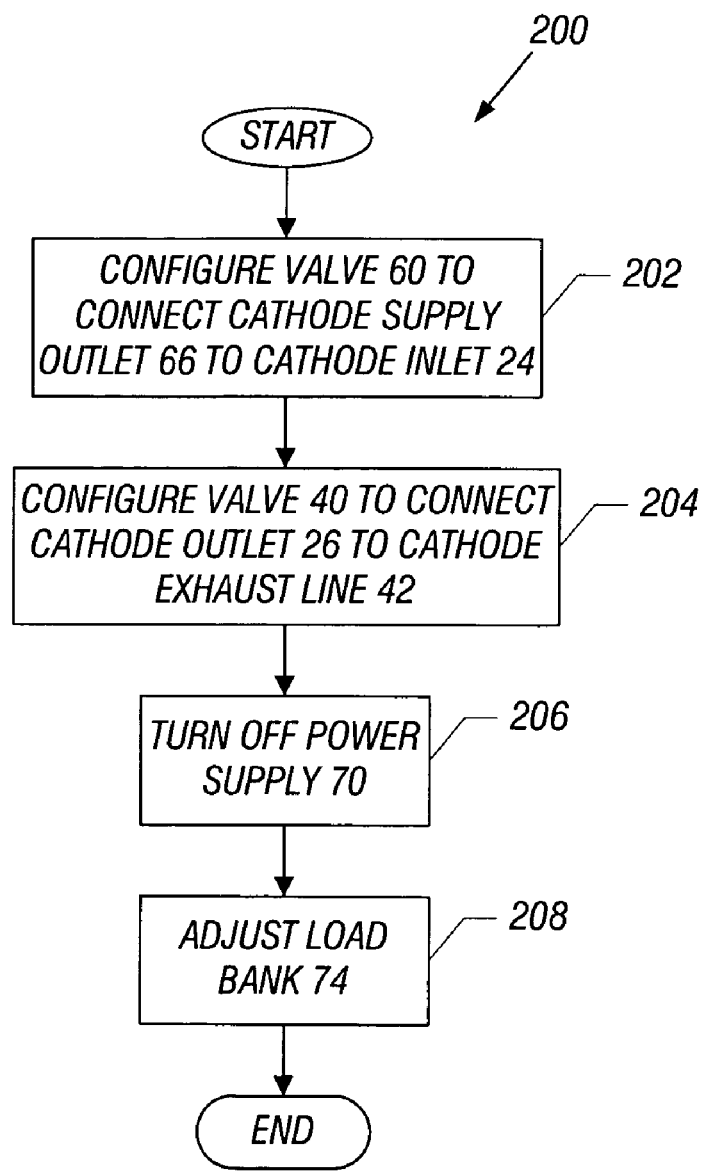
FIG. 6 is a flow diagram depicting a technique to automatically configure the fuel cell stack to produce power according to an embodiment of the invention.

Referring to FIG. 6, in accordance with some embodiments of the invention, the controller 90 performs a technique 200 for purposes of configuring the fuel cell system 10 for the power producing mode of the fuel cell stack 20. Pursuant to the technique 200, the controller 90 configures (block 202) the valve 60 to connect the cathode supply outlet 66 to the cathode inlet 24. The controller 90 also configures (block 204) the valve 40 to connect the cathode outlet 26 to the cathode exhaust line 42. Electrically, the controller 90 turns off (block 206) the power supply 70 and adjusts (block 208) the load bank 74 so that the load bank 74 demands a relatively high level of power.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell stack, comprising:
   routing an anode exhaust of the fuel cell stack to an anode exhaust line;
   isolating the anode exhaust from a cathode chamber of the fuel cell stack; and
   while maintaining the isolation of the anode exhaust from the cathode chamber, selectively establishing communication between the cathode chamber of the fuel cell stack and the anode exhaust line based on a mode of operation of the fuel cell stack,
   wherein the act of selectively establishing communication comprises:
      connecting a cathode inlet of the fuel cell stack to the anode exhaust line in response to the fuel cell stack being configured to operate as an electrochemical pump.

2. The method of claim 1, further comprising:
   selectively connecting a power supply to the fuel cell stack based on the mode of operation of the fuel cell stack.

3. The method of claim 1, further comprising:
   selectively regulating a load connected to the fuel cell stack based on the mode of operation of the fuel cell stack.

4. A method usable with a fuel cell stack, comprising:
   routing an anode exhaust of the fuel cell stack to an anode exhaust line;
   isolating the anode exhaust from a cathode chamber of the fuel cell stack; and
   while maintaining the isolation of the anode exhaust from the cathode chamber, selectively establishing communication between the cathode chamber of the fuel cell stack and the anode exhaust line based on a mode of operation of the fuel cell stack, wherein the act of selectively establishing communication comprises:
controlling a valve to isolate a cathode inlet of the fuel cell stack from the anode exhaust line in response to the fuel cell stack being configured to not operate as an electrochemical pump.

5. The method of claim 4, further comprising:
selectively connecting a power supply to the fuel cell stack based on the mode of operation of the fuel cell stack.

6. The method of claim 4, further comprising:
selectively regulating a load connected to the fuel cell stack based on the mode of operation of the fuel cell stack.

7. A method usable with a fuel cell stack, comprising:
routing an anode exhaust of the fuel cell stack to an anode exhaust line;
isolating the anode exhaust from a cathode chamber of the fuel cell stack; and
while maintaining the isolation of the anode exhaust from the cathode chamber, selectively establishing communication between the cathode chamber of the fuel cell stack and the anode exhaust line based on a mode of operation of the fuel cell stack,
wherein the act of selectively establishing communication comprises:
connecting a cathode outlet of the fuel cell stack to the anode exhaust line in response to the fuel cell stack being configured to operate as an electrochemical pump.

8. The method of claim 7, further comprising:
selectively connecting a power supply to the fuel cell stack based on the mode of operation of the fuel cell stack.

9. The method of claim 7, further comprising:
selectively regulating a load connected to the fuel cell stack based on the mode of operation of the fuel cell stack.

10. A method usable wit a fuel cell stack, comprising:
routing an anode exhaust of the fuel cell stack to an anode exhaust line;
isolating the anode exhaust from a cathode chamber of the fuel cell stack; and
while maintaining the isolation of the anode exhaust from the cathode chamber, selectively establishing communication between the cathode chamber of the fuel cell stack and the anode exhaust line based on a mode of operation of the fuel cell stack,
wherein the act of selectively establishing communication comprises:
controlling a valve to isolate a cathode outlet of the fuel cell stack from the anode exhaust line in response to the fuel cell stack being configured to not operate as an electrochemical pump.

11. The method of claim 10, farther comprising:
selectively connecting a power supply to the fuel cell stack based on the mode of operation of the fuel cell stack.

12. The method of claim 10, further comprising:
selectively regulating a load connected to the fuel cell stack based an the mode of operation of the fuel cell stack.

* * * * *